United States Patent [19]

Masters

[11] Patent Number: 5,001,677
[45] Date of Patent: Mar. 19, 1991

[54] METHODS FOR PROCESSING AND DISPLAYING SEISMIC DATA

[75] Inventor: A. Ronald Masters, Slidell, La.
[73] Assignee: Shell Offshore Inc., Houston, Tex.
[21] Appl. No.: 421,891
[22] Filed: Oct. 16, 1989
[51] Int. Cl.$^5$ ............................................. G01V 1/34
[52] U.S. Cl. .................................................... 367/68
[58] Field of Search .................... 364/421; 367/38, 47, 367/68, 73

[56] References Cited

U.S. PATENT DOCUMENTS

| | | | |
|---|---|---|---|
| 4,316,267 | 2/1982 | Ostrander | 367/68 |
| 4,316,268 | 2/1982 | Ostrander | 367/68 |
| 4,467,461 | 8/1984 | Rice | 367/70 |
| 4,534,019 | 8/1985 | Wiggins et al. | 367/75 |
| 4,554,649 | 11/1985 | Herkenhoff et al. | 367/68 |
| 4,562,558 | 12/1985 | Ostrander | 367/68 |
| 4,570,246 | 2/1986 | Herkenhoff et al. | 367/68 |
| 4,573,148 | 2/1986 | Herkenhoff et al. | 367/47 |
| 4,646,239 | 2/1987 | Bodine et al. | 364/421 |
| 4,692,910 | 9/1987 | Sondergeld et al. | 367/75 |
| 4,779,237 | 10/1988 | Bodine | 367/47 |

OTHER PUBLICATIONS

Young, G. B. and Braile, L. W., Bull Seismol. Soc. Am., vol. 66, 1976, pp. 1881–1885.
Smith, G. C. and Gidlow, P. M., Geophysical Prospecting, vol. 35, (1987), pp. 993–1014.
Chiburis, E. F., 1987, SEG Expanded Abstracts, Paper S 10.1.
Castagna, J. P., Batzle, M. L. and Eastwood, R. C., Geophysics, vol. 50 (1985), pp. 571–581.
Spratt, S., 1987 SEG Expanded Abstracts, Paper 10.7.

Primary Examiner—Ian J. Lobo

[57] ABSTRACT

The present invention provides methods for processing and displaying seismic data to emphasize potential hydrocarbon bearing strata. The methods treat measured attributes from the seismic data as components of a vector, estimate a background vector which represents uninteresting geologic behavior, and then form at least one new attribute which quantifies departures from this uninteresting behavior. The new attributes(s) and other attributes are then appropriately displayed.

13 Claims, 4 Drawing Sheets

METHODS FOR PROCESSING AND DISPLAYING SEISMIC DATA

CROSS-REFERENCE TO PENDING RELATED APPLICATION

This application is related to application Ser. No. 174,658, filed on Mar. 29, 1988, entitled "Methods for Processing Seismic Data", which is expressly incorporated by reference herein.

BACKGROUND OF THE INVENTION

The present invention relates to seismic reflection surveying and more particularly, relates to the processing and displaying of seismic reflection data to emphasize information in seismic signals reflected from contrasts or differences in elastic constants or densities in the subsurface of the earth accompanied by the presence of potential hydrocarbon reservoirs.

The methods of the present invention which are described herein are generally discussed in terms of compressional-wave (P) seismic data acquisition and processing, which is the most common form of seismic data used in exploration seismology. However, it should be understood that these methods may also be employed for information derived from shear-wave seismic data.

Conventional land or marine seismic acquisition techniques involve the use of an appropriate source to generate seismic energy and a set of receivers, spread out along or near the surface of the earth on land or at or near the water surface or water bottom in a water covered area, to detect any reflected seismic signals due to seismic energy striking subsurface geologic boundaries. These signals are recorded as a function of time and subsequent processing of these time varying signals, i.e. seismic "traces" or seismic data, is designed to reconstruct an appropriate image of the geologic boundaries of the subsurface and to obtain information about the subsurface materials. This conventional process has a seismic wave, from a source of seismic energy, travelling down into the earth, reflecting from a particular geologic interface (i.e. a change or contrast in elastic constants and/or densities), and returning to the surface, where it may be detected by an appropriate receiver.

If the seismic-wave velocity is known as a function of depth and lateral position, and if the position and dip of a planar geologic interface are known, the time for the wave to travel down to that particular reflecting interface and reflect back to the surface can be computed for any source and receiver locations. This two-way travel time is usually described by a function t(X,Z), where Z is the depth to the reflecting interface (contrast in elastic constants or density) and X is the horizontal distance (offset) between source and receiver.

If the elastic constants and densities of the materials above and below a planar reflecting interface are known, then the reflection coefficient for that interface may be computed. This reflection coefficient is the ratio of reflected amplitude to incident amplitude and will depend on the angle of incidence at the reflecting interface. The angle of incidence, $\Theta$, is the angle between the ray normal to the incident downgoing wavefront and a line normal to the interface; as is well known, the incident and reflected rays will be in a plane normal to the interface. This angle of incidence increases with increasing offset X. The reflection coefficient for a compressional wave from a particular interface will be designated by the function $R_P(\Theta)$, where the angle $\Theta$ may be related to the offset distance X and depth of reflector Z if the compressional-wave velocity at all points in the earth is known; this velocity information, or a reasonable approximation thereto, is referred to as a "velocity model". For a given reflector, the reflection angle, $\Theta$, and offset, X, are geometrically related, so any discussions herein in terms of dependence upon offset (offset dependence) is equivalent to dependence upon reflection angle (angular dependence). The angular (or offset) dependence of reflection amplitude may be computed exactly for a point source and plane reflector, however in most practical cases it may be approximated adequately by plane-wave reflection coefficients (reflection coefficients for an incident plane wave) which are easily calculated using expressions derived from the results of Zoeppritz (see for example, Young, G. B. and Braile, L. W., Bull Seismol. Soc. Am., Vol. 66, 1976, pp. 1881-1885). For a compressional-wave reflection from a planar interface between two media having a small contrast (i.e., with the medium containing the incident and reflected waves having a compressional velocity $V_P$, a shear velocity $V_S'$ and a density $\rho$, and the other medium having a compressional velocity of $V_P+dV_P$, a shear velocity $VS+dV_S'$ and a density $\rho+d\rho$, and where $dV_P/V_P$, $dV_S/V_S$, and $d\rho/\rho$ are small compared to one), the offset (or reflection angle) dependence of reflection amplitude may be described for angles of incidence less than the critical angle by an expansion of the form, $$R_p(\Theta) = R_p(0) + K\sin^2(\Theta) + L\sin^4(\Theta) + \tag{1}$$

For the discussion herein, the angles of incidence are limited to angles such that the terms of the order of $\sin^4(\Theta)$ and higher are negligible.

In Equation (1), $R_P(0)$ is the normal incidence ($\Theta=0$) reflection coefficient; $R_P(0)$ depends only on the densities and compressional velocities of the two media. K is a constant, which also depends on the elastic properties and densities of the media. The relationship of K to the elastic properties and densities may be expressed in a number of ways. One particularly simple expression which relates K to the contrasts in shear velocities, compressional velocities, and densities is $$K = R_{\alpha} - 4(V_S/V_p)^2(2R_\beta + R_\rho), \tag{2}$$

where $$R_\alpha = dV_P/(2V_P + dV_P), \tag{2a}$$

$$R_\beta = dV_S/(2V_S + dV_S), \text{ and} \tag{2b}$$

$$R_\rho = d\rho/(2\rho + d\rho). \tag{2c}$$

Also, in terms of these same coefficients, the normal incidence or zero offset reflection coefficients are given exactly by, $$R_P(O) = \frac{R_\alpha + R_\rho}{1 + R_\alpha R_\rho}, \text{ and} \tag{2d}$$

$$R_S(O) = \frac{R_\beta + R_\rho}{1 + R_\beta R_\rho}. \tag{2e}$$

For sufficiently small values of $R_\alpha$, $R_\beta$, and $R_\rho$, equations 2d and 2e may be approximated as, $$R_P(0) = R_\alpha + R_\rho, \text{ and} \qquad (2f)$$

$$R_S(0) = R_\beta + R_\rho. \qquad (2g)$$

Thus, measurement or the normal incidence compressional-wave reflection coefficient, $R_P(0)$, gives information about the densities and compressional velocities, while measurement of the offset dependence constant K can provide information about the densities and shear velocities of the media.

Although the formulas given above are for small contrasts in the elastic properties and densities above and below the planar interface more general theoretical relations may be used. Similar relationships (to equation 1) are well known for the offset dependence of shear-wave reflection coefficients, although the particular form for such shear-wave equations especially those that are analogous to equations 2-2g is quite different. Analogous relations are also well known for mode-converted reflections in which the incident P (or S) wave produces a reflected S (or P) wave. Moreover, the P and S velocities and impedances (impedance is the product of the appropriate velocity and density) may be described as functions of the densities and elastic constants of the materials involved.

There are a number of geologic questions important to exploration for hydrocarbon reservoirs which can be answered by acquiring a knowledge of both the compressional- and shear-wave properties (hereinafter referred to as compressional properties and shear properties) of the subsurface materials. For instance, these materials are generally porous with various fluids filling the pore space. The velocity of a compressional seismic wave in such media depends strongly on the rock matrix properties as well as those of the pore fluid. On the other hand, velocities for shear-wave seismic waves depend strongly on the rock matrix but only slightly on the pore fluid. Thus, detailed study of the properties of the media with both compressional and shear waves provides an opportunity to characterize any changes in seismic response as being due to changes in fluid content (e.g. from brine to oil, or oil to gas) or changes in the rock matrix (e.g. from sandstone to shale or a change in porosity). The ratio of $V_P$ to $V_S$ is often a useful diagnostic feature of such changes. It should be noted that, even without lateral variation, in many cases the recognition of fluid content or rock type may be possible with an accurate knowledge of the compressional and shear properties at a single location. Distinguishing between fluid effects and lithology effects, and detecting different porosity and lithology types are of vital seismic exploration interest and the desire to make such distinctions has engendered significant effort in the measurement and interpretation of shear properties in addition to the information concerning compressional properties traditionally inferred from conventional compressional reflection prospecting.

It is generally the objective of seismic exploration to generate seismic energy, make measurements of the reflection amplitude of this energy at various offsets and for various times, and then, by employing various processing steps on such seismic data, to deduce the geometry as well as some of the elastic properties and densities of the materials of the earth through which the seismic energy has propagated and from which it has been reflected.

Conventional processing of compressional-wave data uses data collected with many sources and many receivers and then sorts the traces according to the "midpoint" between the source and receiver, as illustrated in FIG. 1A. Traces associated with a common midpoint (CMP) are gathered, and used to characterize the subsurface properties below that surface gather point. For example, in FIG. 1A, $S_1$ and $R_1$ are the source and receiver pair for the first trace and have a midpoint at the surface point 0. Figure 1B depicts the corresponding hyperbolic moveout of such data (where the numbers used correspond to the subscripts used in FIG. 1A) and FIG. 1C depicts the corresponding variation of reflection coefficient with offset for such a case.

The original basis for CMP processing is the fact that each trace in a gather images (or consists of reflections from) approximately the same subsurface points, and, when properly adjusted for differing path lengths, the set of corrected traces may be "stacked" or averaged to give an enhanced picture of the reflection response of the earth below that CMP surface location by emphasizing true primary reflections and discriminating against multiple reflections and other undesirable noise. It is usually assumed that the resulting "stacked" trace represents the normal incidence (zero-offset) response of the earth. While this procedure has been very effective in improving signal-to-noise ratios for seismic data in many areas, it ignores the fact that reflection amplitudes vary as a function of offset and that the stacked trace is not equivalent to a normal incidence trace.

The data is then conventionally displayed as a seismic "section" consisting of the stacked traces arranged side by side in a CMP sequence along the seismic survey line. This display represents a cross-sectional slice of the earth. A set of amplitudes which are recognizably associated on some adjacent traces in a seismic section is called an "event", and is usually assumed to represent seismic reflections from different locations on the same geologic stratum in the subsurface. Many properties of subsurface geologic stratum may be inferred from examination of seismic events and their lateral and vertical variations.

It is sometimes useful to describe events (or other portions of the data) in terms of "attributes". An "attribute" is used herein to mean the result of a specific mathematical operation performed on a portion of the data. For example, seismic data may be processed so that positive amplitudes correspond to strata which have higher impedances than underlying or overlying strata, while negative amplitudes correspond to lower impedance strata. For this example, an event duration attribute may be defined to be the time interval on each trace during which the event's amplitude does not change sign; this attribute is useful because it relates to the thickness of the geologic stratum, although it also depends on the velocity of sound in the stratum and on the bandwidth of the seismic data. Generally attributes are influenced by seismic processing, but their usefulness comes from their dependance on specific properties of the subsurface material.

Methods have been described for measuring and interpreting the variation with offset of the reflection amplitude from a given subsurface interface. Techniques which are tau example in U.S. Pat. Nos. 4,562,558 to Ostrander, 4,573,148 to Herkenhoff et al, 4,570,246 to Herkenhoff et al, 4,316,267 to Ostrander, 4,316,268 to Ostrander, and 4,534,019 et al explicitly describe methods for measuring and interpreting amplitude variation with offset.

As noted above, much attention has been directed to how to interpret amplitude versus offset (AVO) attributes. Some studies have been purely empirical, (Chiburis, E. F., 1987 SEG Expanded Abstracts, Paper S 10.1) measuring the amplitude variation with offset of a particular target event in a particular geographical area, correlating the results to the fluid content of the corresponding stratum found in existing wells in the area, and then predicting the best location for drilling future wells based upon this correlation. This technique is effective, but rules of thumb developed in one area are likely to be less effective elsewhere. In particular, amplitudes rising with offset are not necessary or sufficient to indicate gas or oil sands in the Gulf of Mexico.

Smith and Gidlow (Smith, G. C. and Gidlow, P. M., Geophysical Prospecting, Vol. 35 (1987), pp 993–1014) describe an AVO attribute called the "fluid factor". They estimate $V_P$ and $V_S$ contrasts from AVO, which requires assuming functional forms for $\rho(V_P)$ and $V_P(V_S)$. These assumed relations are intended to characterize brine-saturated elastic rocks, and are derived from well control or from laboratory data, such as that from Castagna et al (Castagna, J. P., Batzle, M. L. and Eastwood, R. C., Geophysics, Vol. 50 (1985) pp 571–581). The fluid factor is the difference between the $V_P$ contrast estimated from AVO for each seismic event and the one predicted from the assumed $V_P(V_S)$ relation. Smith and Gidlow need to adjust the $V_P(V_S)$ relation in order to "obtain a good result", citing reflection-independent AVO contaminants discussed later herein. Thus, they require some prior knowledge of the relationship between the variables ($\rho$, $V_P$, and $V_S$) and are unable to determine this relationship from the seismic data alone.

These and other limitations and disadvantages of the prior art are overcome by the present invention, however, and improved methods are provided for processing seismic data and displaying information obtained therefrom in a manner to highlight potential hydrocarbon bearing strata.

SUMMARY OF THE INVENTION

In a preferred embodiment of the present invention seismic data that has been acquired employing a multiplicity of known source and receiver locations is processed according to the methods of the present invention to provide improved seismic displays. The present invention provides new processing methods or techniques which treat measured attributes derived from seismic data as components of a vector, estimate a background vector representing typical (i.e. uninteresting) background geologic strata, and then calculate or determine a new attribute, which is preferably the component of the measured attribute vector which is orthogonal to the estimated background vector. This "background normal" attribute (which is a way of compensating the measured attributes for the behavior of background reflectors) emphasizes reflectors which are most likely to represent prospective hydrocarbon bearing layers and has high visual impact when displayed as a seismic section. The present invention also provides new displays of information resulting from the processing methods of the present invention.

The preferred methods of the present invention may employ amplitude versus offset information obtained during such processing or amplitude information from separate P and S surveys, and provides an improved diagnosis of potential hydrocarbon bearing strata. Separate P and S surveys may be converted mode surveys. Seismic reflection surveys indirectly measure P- and S-wave impedance contrasts between rock layers in the subsurface. In general, such impedances have been found to cluster according to lithology and fluid type. The preferred methods of the present invention provide a new measure of contrasts in P and S impedances between adjacent geologic layers from either seismic amplitude versus offset behavior or from amplitude information from separate P and S surveys.

It is an object of the present invention to provide a method for improved processing and displaying of seismic data to more clearly identify potential hydrocarbon bearing strata.

It is an object of the present invention to provide a method for improved processing of seismic data to more clearly identify potential hydrocarbon bearing strata.

It is an object of the present invention to provide improved displays of seismic data to more clearly identify potential hydrocarbon bearing strata.

It is an object of the present invention to provide a method for improved processing, display, and interpretation of seismic data to present potential hydrocarbon bearing strata in a more easily recognized form.

It is an object of the present invention to extract from seismic data attributes which more clearly distinguish potential hydrocarbon bearing strata from other strata.

It is an object of the present invention to extract from seismic data attributes which more clearly distinguish geologic strata with anomalous densities and/or elastic constants.

It is an object of the present invention to provide a method for interpreting seismic data, comprising, generating seismic records with a multiplicity of known source and receiver locations, determining more than one attribute from said seismic records representative of signal amplitudes and their variations with offset, determining for a portion of said seismic records the typical behavior of said attributes which characterizes non-reservoir formations, forming at least one new attribute which is compensated for said typical behavior, measuring said at least one new attribute and displaying said at least one new attribute.

It is an object of the present invention to provide a method for interpreting seismic data, comprising, generating seismic records with a multiplicity of known source and receiver locations, determining more than one attribute from said seismic records representative of signal amplitudes and their variations with offset, and displaying said attributes in a manner to discriminate between potential hydrocarbon bearing strata and other strata.

It is an object of the present invention to provide a method for interpreting seismic data, comprising, generating seismic records with a multiplicity of known source and receiver locations, determining more than one attribute from said seismic records which contains information about elastic properties and densities of the subsurface, determining for a portion of said seismic records behavior of said more than one attribute which characterizes non-reservoir formations, and forming at least one new attribute which quantifies departures of said attributes from said behavior which characterizes non-reservoir formations.

It is an object of the present invention to provide a method for processing seismic data, comprising, generating seismic records with a multiplicity of known source and receiver locations, determining optimized stacking velocities and attributes characterizing the variation of amplitude with offset, determining background vectors, determining background normal vector attributes, and displaying at least said attributes.

These and other objects and advantages of the present invention will become apparent from the following detailed description, wherein reference is made to the Figures in the accompanying drawings.

DETAILED DESCRIPTION OF THE INVENTION

Figure 1A:
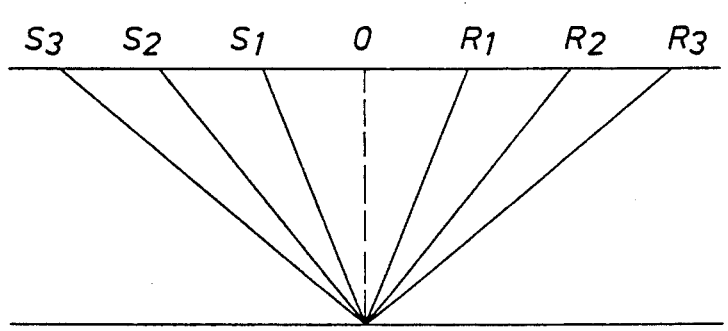
FIGS. 1A, 1B, and 1C depict conventional seismic common midpoint acquisition geometry, the hyperbolic moveout of reflection data so obtained, and the variation of reflection coefficient with offset, respectively.
Figure 1B:
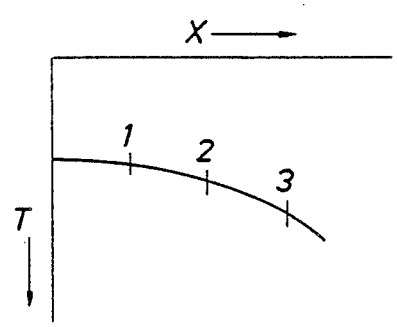
Figure 1C:
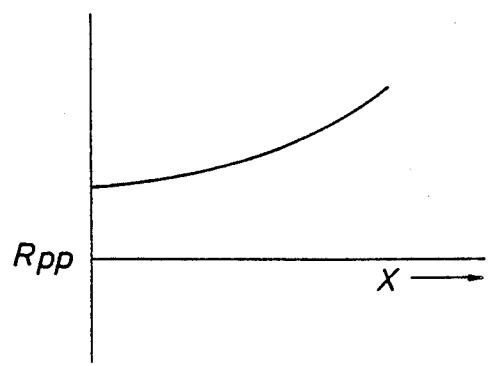

The present invention provides new methods for processing, displaying and interpreting conventionally acquired seismic field data. However, additional processing steps may be performed as necessary or desired before or after any of the processing steps of the present invention.

The methods of the present invention which are described herein are generally discussed in terms of compressional-wave (P) seismic data acquisition and processing, which is the most common form of seismic data used in exploration seismology. It should be clearly understood that these methods may also be employed with shear-wave seismic data acquired using an appropriate shear source and appropriate shear motion detectors. That is, the currently preferred method of the present invention utilizes both compressional-(P) and shear-(S) wave properties and these properties may be obtained from any combination of separate P and S surveys, converted wave surveys using a P (or S) source and S (or P) motion detectors, or either a P or S survey analyzed for amplitude versus offset effects. Further, the methods of the present invention may also be employed using seismic data acquired with sources and/or receivers located in a borehole(s).

As noted before, seismic reflections occur when compressional (P) or shear (S) waves encounter an impedance contrast in the subsurface. Measurements of the reflected wave amplitudes can be used to determine the values of the contrasts which produced them. This information is useful in hydrocarbon exploration because the lithology and fluid content of a rock are highly correlated with its P and S impedances. Thus, seismic amplitudes can be used to diagnose potential hydrocarbon reservoirs.

The present invention provides new processing methods or techniques which treat measured attributes derived from seismic data as components of a vector, estimate a background vector representing typical (i.e. uninteresting) background geologic strata, and then calculate or determine a new attribute, which is preferably the component of the measured attribute vector which is orthogonal to the estimated background vector. This "background normal" attribute (which is a way of compensating the measured attributes for the behavior of background reflectors) emphasizes reflectors which are most likely to represent Prospective hydrocarbon bearing layers and has high visual impact when displayed as a seismic section. The present invention also provides new displays of information resulting from the processing methods of the present invention.

The preferred embodiment of this invention combines information about P and S impedance contrasts so as to discriminate prospective reservoir strata from surrounding non-reservoir or "background" strata. Alternative embodiments may include information about densities, P velocities, and S velocities, or may express the material properties in terms of other variables such as elastic constants. The choice of variables to use in relations among reflection amplitudes and material properties is governed by measurement accuracy and ease of interpretation. All embodiments include multiple attributes and the evaluation of relationships among these attributes in a multidimensional space to discriminate prospective reservoir strata from non-reservoir strata. A key component of the present invention is called the "background normal" amplitude, which is designed to answer directly the fundamental question of seismic amplitude analysis: "How distinct is a given geological unit from local non-reservoir rocks". Conventional amplitude analysis makes use of this separation in one variable, the compressional (P) impedance. The methods of the present invention extend this analysis to include multiple variables or attributes, The preferred embodiments of the present invention employ attributes which closely represent P and S impedance contrasts, i.e. contain the same information as the P and S impedance contrasts. Other embodiments of the present invention may employ other attributes as long as these attributes are useful in characterizing the behavior of hydrocarbon bearing strata in a manner to emphasize such strata in contrast with other uninteresting background or non-reservoir strata. Some of the methods of the present invention may be used in a purely empirical way, i.e., by correlating the results obtained by such methods to the fluid content of strata penetrated by existing wells and then selecting future well sites which most resemble the successful existing wells. For such empirical uses it is not necessary to understand how each attribute is related to the density and elastic constants.

The specific choice of attributes to be employed in the methods of the present invention and their relation to rock properties depends on the type of seismic survey (or surveys) being analyzed. The discussion hereinbelow emphasizes the relation of AVO attributes, determined from a compressional survey, to rock properties, since this is the easiest type of survey to conduct. However, seismic data obtained from other types of surveys may be similarly analyzed.

P and S seismic amplitudes can be measured in separate surveys using polarized sources and/or receivers or from amplitude variation with offset. For amplitude variation with offset analysis of a compressional wave survey, S amplitude (or P amplitude) information [that is normally extracted from a single shear (S) wave (or compressional (P) wave) survey] is obtained from the variation of compressional wave amplitude (or shear wave amplitude) with offset which depends on both P and S impedance contrasts at a reflector. In accordance with the preferred methods of the present invention, S amplitude (or S impedance) is determined from the effect of amplitude variation with offset for compressional seismic data. Such amplitude variation must first be characterized, and as noted hereinbefore, the general characteristics of offset dependence of reflection amplitudes for compressional data have been found to be adequately approximated for a given interface as:

$$R_P(\Theta) = R_P(0) + K \sin^2(\Theta) \tag{5}$$

where $R_P(0)$ is the normal incidence ($\Theta = 0$) reflection coefficient and K is a constant, and both $R_p(0)$ and K depend on the elastic properties and densities of the two media, as described in equations 2.

Although the particular term used for including the offset dependence of reflection amplitude is preferably $\sin^2(\Theta)$, other terms may be employed in the methods of the present invention. Alternative approximation expressions such as, $$R_P(\Theta) = R_P(0) + K' \tan^2(\Theta) \tag{5'}$$

$$R_P(\Theta) = R_P(0) + K'' X^2 \tag{5''}$$

may work nearly as well in fitting the offset dependence observed in most data over a limited offset range. The approximation expression employed to describe the offset dependence will have some effect on how large an offset range may be used in the processing and how large the reflection contrast may be before the approximation becomes inadequate. The choice of offset variable (i.e., source-receiver separation, reflection angle, injection/emergence angle, etc.) has little effect on the quality of fit to the data, but does affect the details of how the measurement of the offset dependence can be interpreted in terms of the determined attributes, such as P and S impedances or elastic properties and densities.

A suitable parameterization of offset dependence, such as in terms of P amplitude and S amplitude or other attributes, allows for establishing a relation between such attributes and impedance contrasts. These impedance contrasts may also be used to classify and distinguish among various rock types. One parameterization of offset dependence, noted hereinabove, suitable for small contrasts and small angles of incidence and which approximates the P-wave reflection coefficient R (for a plane compressional wave incident at angle $\Theta$) is, $$R(\Theta) \approx R_P(0) + K \sin^2\Theta, \tag{5}$$

or in the notation of the incorporated patent application, $$R(\Theta) = A + B\sin^2\Theta. \tag{6}$$

For small contrasts, A is just $R_p(\Theta)$, the normal incidence P reflection coefficient, i.e., the P impedance contrast. From equation 2f (including equations 2a and 2c) A may be written as:

$$A = R_P(0) = dV_P/(2V_P + dV_P) + d\rho/(2\rho + d\rho) \tag{7}$$

where $\rho$ and $V_P$ are the density and compressional velocity, respectively. A useful combination of A and B may be made that is herein called the pseudo-shear reflection coefficient ($\Psi$) and is, $$\Psi = (A - B)/2 \tag{8}$$

Similarly, for small contrasts, $\Psi$ may be written as $$\Psi + \eta \Delta V_S) = \frac{1}{2}(1 + \eta) \Delta \rho/(2\rho + \Delta \rho), \tag{9}$$

where $V_S$ is the shear velocity and $\Psi = (2V_S/V_P)^2$. $\Psi$ is independent of the P velocity contrast, and reduces to the true normal incidence shear reflection coefficient (equation 2g) when $V_P/V_S = 2$. ($V_P/V_S$ typically ranges from 3 to 1.8 in prospective intervals, decreasing with depth.)

A preferred embodiment of the present invention obtains the seismic attributes A and $\Psi$ by fitting equation 6 to the offset dependence behavior for the seismic data for each CMP gather at each sample time (as described in the incorporated patent application) and then using equation 8 to determine $\Psi$ from A and B. The attributes A and $\Psi$ are interpreted as representing the rock properties given in equations 7 and 9; the seismic attributes are of course contaminated with noise, with offset dependent amplitude variations unrelated to changes in reflection coefficients, and with the effects of the approximation used to obtain equations 6, 7 and 9.

These contaminating effects are minimized as much as possible by appropriate processing steps and then the methods of the present invention are used to display attribute vectors (A, $\Psi$) and form the background normal amplitude therefrom. Other embodiments may use other combinations of the attributes A and B, and form the background normal amplitude therefrom. An alternate embodiment uses attributes which are coefficients in equations similar to, but other than, equation 6, e.g., equations 5' and 5''. The choice of attribute employed has little effect on the quality of fit to the data, but does affect the details of how the measurement of such attributes can be interpreted in terms of other determined attributes, such as P and S impedances, their analogs, or elastic properties and densities.

Conventional amplitude analysis is inadequate to assess some seismic objectives. An observed P impedance contrast could be caused by a hard non-reservoir rock overlying a soft non-reservoir rock. Alternatively, the same observed P impedance contrast could be caused by non-reservoir rock over a hydrocarbon reservoir. The methods of the present invention provide a direct and easy way to distinguish between these alternatives by generating a "background normal" amplitude display.

Figure 2:
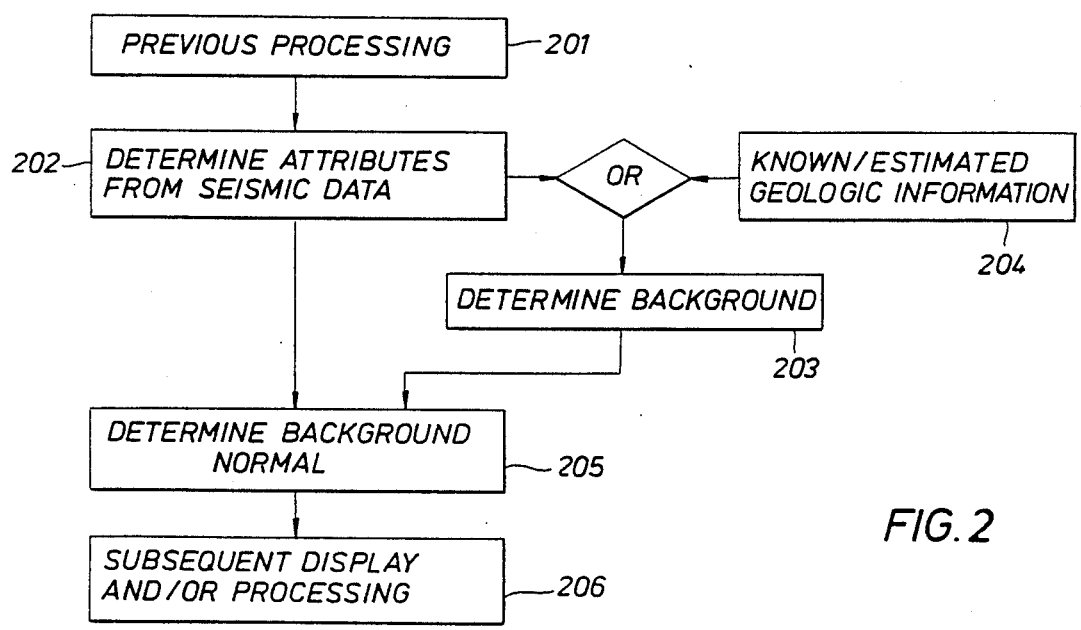
FIG. 2 depicts a simplified flow chart of the processing steps of a method of the present invention.

Referring now to FIG. 2, a general flow chart of the steps for generating such a background normal display is depicted. As noted in FIG. 2, previous processing steps 201 may be performed before the processing steps of the present invention are performed. Initially, selected attributes, such as A and $\Psi$, are determined from the seismic data 202 by processing methods described previously herein.

Next, amplitude pairs of A and $\Psi$, i.e. (A,$\Psi$), are formed as 2-component vectors in an impedance space. In amplitude versus offset (AVO) analysis, these amplitude vectors may be easily defined at each point on the seismic section. The same technique for forming a vector could be used with compressional and shear amplitude pairs (P,S) derived from separate surveys, but it is probably impractical to determine such pairs at every point. The technique of forming vectors from attribute values may also be used for more than two attributes. For example, density, $V_P$ and $V_S$ may be used as such attributes. It is beneficial to include more attributes if they can be accurately determined and if they serve to discriminate between classes of rocks or fluids.

Figure 3:
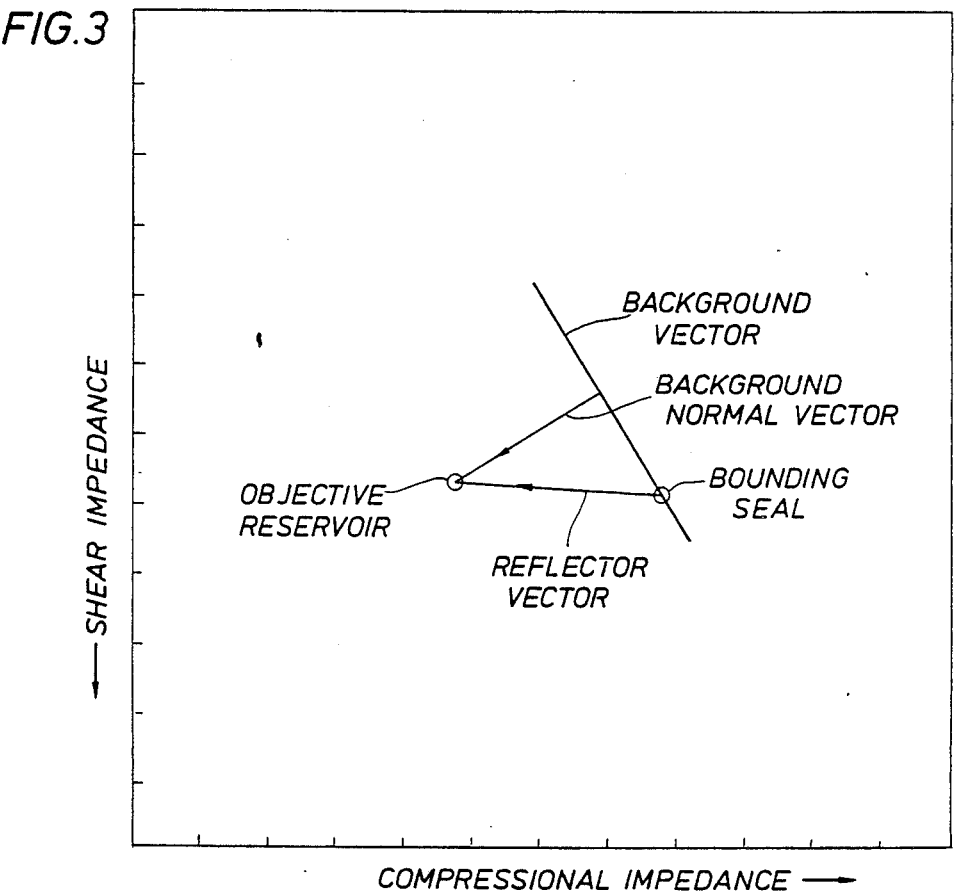
FIG. 3 depicts an improved display representative of portions of the present invention.

Next, a background vector 203 is determined either from the seismic data or known/estimated geologic information. More specifically, this is either: (1) some average vector over a background gate of seismic data or (2) the vector for non-reservoir strata predicted from known or estimated geologic information 204 (e.g., typical P and S impedances for non-reservoir layers as a function of depth from local wells). These two methods (an average from seismic data or predicted from geologic information) are more fully described later herein. If derived from the seismic data in a background gate, the background vector will characterize the impedance contrasts which actually occur in the subsurface. FIG. 3 illustrates the various vectors of the present invention for reflections between selected rocks. In FIG. 3, the background vector may connect the hard (bottom of background vector) and soft (top of background vector) non-reservoir rocks.

The background normal vector, which is perpendicular to the background vector, is then determined from the amplitude vector $V=(A,\Psi)$, 205. Explicitly, the background normal amplitude is the cross product, $$V \times b = A \sin\theta - \Psi \cos\theta, \qquad (10)$$

between V and the unit background vector $b=(\cos\theta, \sin\theta)$, where $\theta$ is the angle from the A axis to b. $V \times b$ is soft (negative) for reflectors which are softer in A and harder in $\Psi$ than background reflectors. If the background vector accurately represents the P and S impedances for non-reservoir rocks, $V \times b$ will be small for reflections from them, no matter how high an amplitude they have on a conventional display section. In FIG. 3, the background normal vector (or amplitude) for the reflection at a non-reservoir rock/objective rock boundary is the perpendicular distance from the objective reservoir to the background vector. As noted in FIG. 2, after the background normal vector (or amplitude) is determined, the information may be displayed, as noted later herein, or may undergo additional processing steps 206.

The background normal amplitude technique of the present invention is a robust tool for interpreting offset dependence. Local rock properties are represented by the background vector, and hence are automatically incorporated in the analysis. When the background vector is derived from the seismic data itself, $V \times b$ measures the relative offset dependence of each event compared to the background. It will therefore be insensitive to factors (e.g., source and receiver array effects, wavefront spreading, and absorption) which are offset dependent but unrelated to impedance contrasts. (These are the AVO contaminants that were noted earlier herein.) In addition, numerical criteria may be generated to discriminate among specific fluid and lithologic types. Such numerical criteria may be based upon or calibrated by any available well or laboratory data.

Figure 4A:
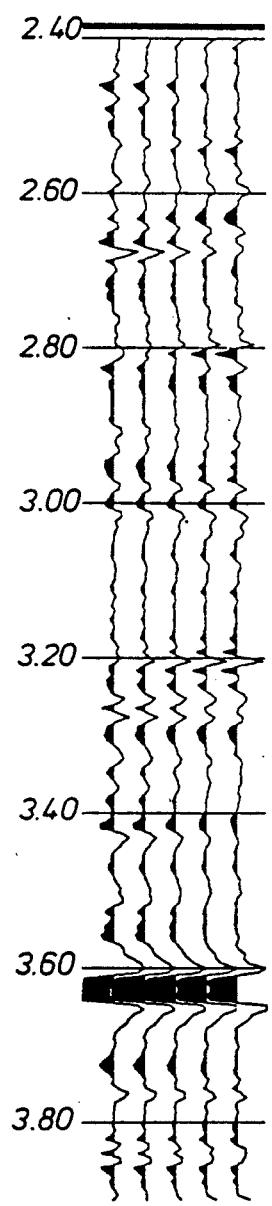
FIGS. 4A, 4B, 4C depict respectively, a normal compressional incidence, psuedo-shear, and background normal display for a portion of a seismic model.
Figure 4B:
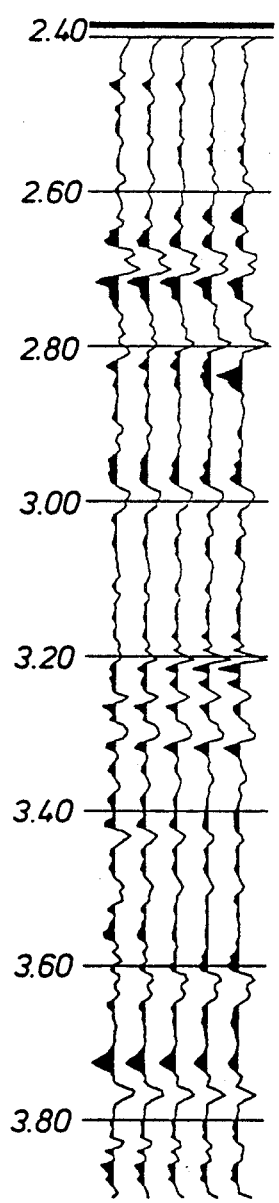
Figure 4C:
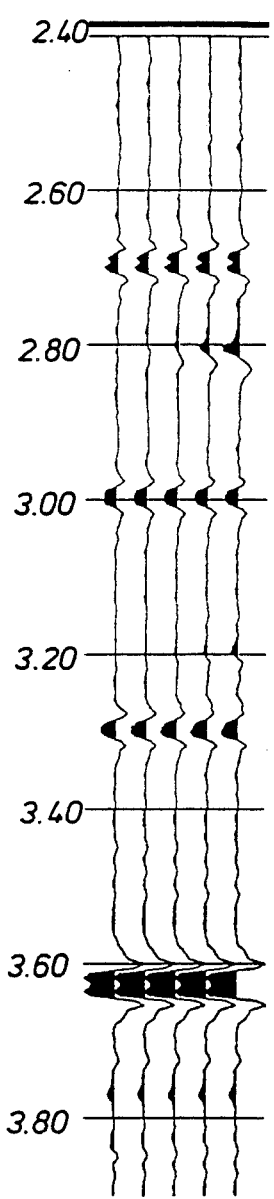

Even without numerical calibration a background normal section display can be a high-impact interpretive tool. FIGS. 4a and 4b show the normal incidence and pseudo-shear responses, respectively, of a portion of a model seismic section. The model has four reservoir layers encased in non-reservoir rock. FIG. 4c is the background normal section display derived from the same model. The non-reservoir events have been extinguished, while the reservoir layers remain as the dominant events on the section. Thus, the background normal section improves the reliability of the same cue already known in hydrocarbon exploration—that the highest amplitude is usually the best prospect.

Measured A and $\Psi$ (or $V \times b$) amplitudes are proportional to intervals in impedance space (in various directions), although the exact value of the proportionality factor between amplitude and impedance depends on $V_P/V_S$. Thus, it is unnecessary to attempt to convert the seismic attributes or their differences to impedances.

Figure 5:
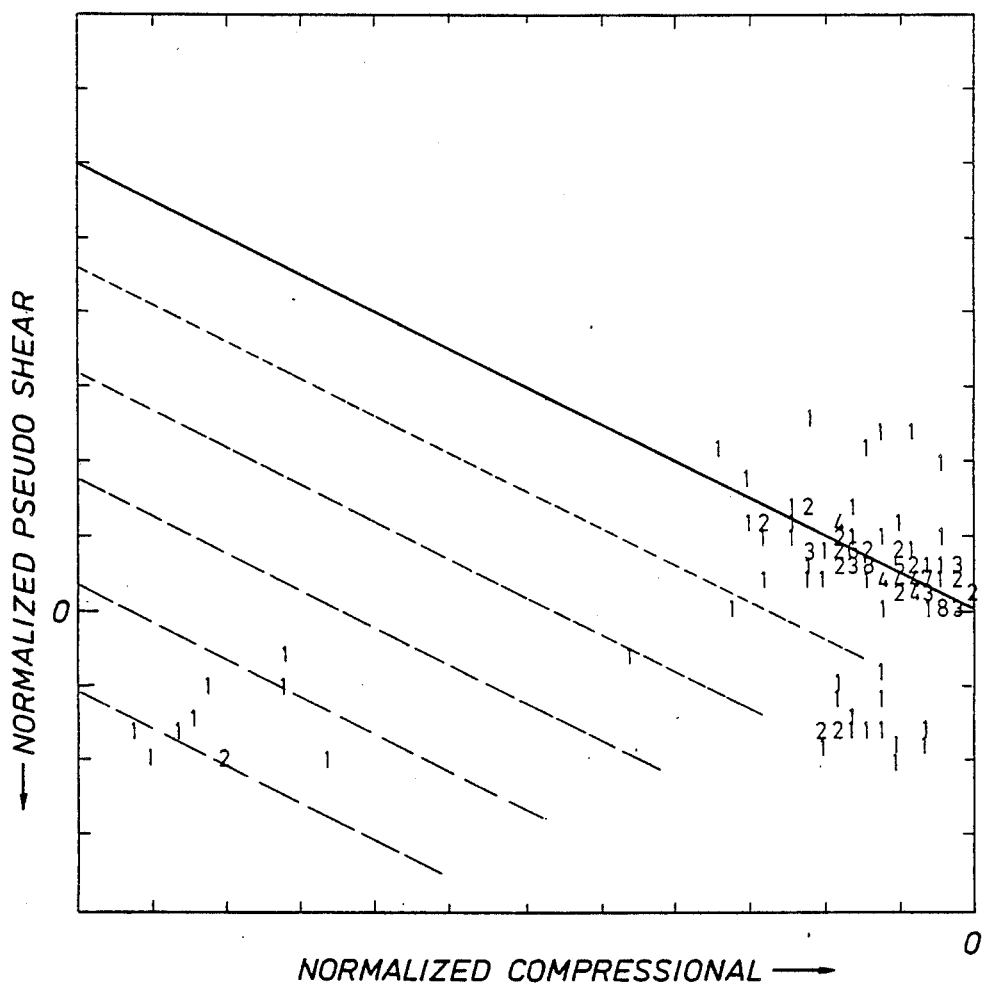
FIG. 5 depicts an improved display of the determined attribute vectors for a selected event from the data of FIG. 4.

In particular, FIG. 5 shows an improved display of the present invention and is a histogram of the peak amplitude measurements (in vector representation) of the events in FIG. 4, measured on the A and background normal sections. The solid line indicates the average direction of the background vector derived from the data. The reservoir zones lie to the lower left of the background line, well separated from the background events.

Although the background vector may be determined in any manner that characterizes A and $\Psi$ amplitudes over the bulk of the seismic data, preferably the background vector is determined from the seismic data using a time gate on each trace. The times are varied downline to follow the structure of the stratigraphic unit being investigated. Although it is preferred that each A-trace peak (maximum) and trough (minimum) be picked in a time gate, and $\Psi$ values picked at the same time samples, other methods of selecting corresponding A and $\Psi$ amplitude values may be employed. For example, it is possible to determine amplitudes from: the area under a "loop" on the trace; the peak amplitude relative to zero; the peak amplitude relative to preceding and succeeding events; the peak amplitude compared to some average background amplitude; or on a sample by sample ratio basis. Further, it is preferred that very weak (noise-dominated) and very high amplitude events be discarded in determining the background vector, although this step is optional.

Then having formed a set of $(A, \Psi)$ vectors (where the amplitude of A and the amplitude of $\Psi$ at a location and time are the two components of the vector for that location and time) which represent the background behavior, there are many ways to calculate a background normal vector. A preferred method is to use a background vector which has the median value of $\Psi/A$. The median is useful because it is non-parametric; i.e., the value does not depend on a choice of ratio, angle, or trigometric function to characterize the direction of the background vector. Alternatively, the background direction may also be derived by principle component (eigenvector) analysis, using an optimization algorithm. Eigenvector analysis is more easily generalized to the case of vectors with more than two components. These operations may be performed on any set of attributes (as the vector components), not just A and $\Psi$. In any event, the background direction may be smoothed over several traces symmetrically up and down the seismic survey line, before calculating the amplitude and direction representative of the background normal.

In order to determine the background vector from known or estimated geologic information, the density and compressional velocity of the uninteresting lithology should be known or assumed; for example, densities and P velocities are commonly available as functions of depth at prospects in hydrocarbon-producing regions. When shear well logs are not available, shear velocities may be inferred from P velocities. One example is to calculate A and $\Psi$ for non-reservoir reflections at uniform depth intervals (using equations 7 and 9). The background vector is interpolated from depth to time using velocities derived from the seismic data.

Optimal A and B traces may be considered, either individually or in various combinations, as attributes characteristic of the seismic data (which are representative of the properties of the earth) and these attributes may be displayed and interpreted by conventional or other methods. For example, the traces may be used to provide information about elastic properties and densities.

The methods of the present invention may be employed to display any set of seismic attributes such as A and B, or other attributes as discussed herein. The present invention provides a method for discriminating between potential hydrocarbon bearing strata and other strata by emphasizing those events that have anomalous relations between selected attributes. The present invention also provides methods for forming new attributes which have a more robust interpretation than the attributes or interpretation techniques heretofore available. The discussion hereinbelow provides some illustrations of various attributes, their interpretation and limitations, and how the background normal attribute overcomes or avoids these limitations.

The A attribute is obviously useful because it is the normal incidence P reflection coefficient. B describes the appearance of an event on a common midpoint gather, but does not by itself describe any particular rock property. Therefore the sum, difference, ratio, and product of A and B are used to relate offset dependence to rock properties. A·B emphasizes the softest events with the greatest offset dependence, which sometimes are the hydrocarbon bearing strata. $(A-B)/2 = \Psi$ most nearly characterizes shear impedance contrasts. B/A may be easily converted to the direction of the vector amplitude $(A, \Psi)$, without regard to its magnitude. $(A+B)/2$ approximates contrasts in $V_P/V_S$ ratio, with some contamination from density contrasts. $A+0.087B$ is an unweighted conventional stack (obtained by averaging equation 6 over 0–30°).

However, all AVO based processing, display and interpretation methods are vulnerable to extraneous amplitude effects which are unrelated to impedance contrasts. These effects include source and receiver array effects, ghosts, receiver sensitivity variations, wavefront spreading, absorption, interference from multiple reflections, and stretch. Typically, correction for the dominant effects is deterministically done (i.e. based upon some objective criteria), insofar as possible. The background normal amplitude, as a relative measurement, automatically makes an additional adjustment for these effects, which are common to all the events in the background gate.

In addition, each of the arithmetic combinations has particular limitations. A·B is just a way of displaying the rule of thumb that "rising amplitude means pay". B/A is inconvenient for interpreters because the interesting values are normally not extreme values. B/A ranges from positive to negative infinity in every data set, but the values which indicate prospective strata must be estimated from impedance depth data on a case by case basis. Finally, B/A amplitude measurements for the specific events must be interpreted in tandem with conventional amplitude analysis, since B/A ignores the amplitude of any high amplitude event. The B/A attribute is noise dominated when A is small; i.e., at every zero-crossing on every trace. B/A should be calculated by averaging over a time window with about the same time duration as a typical event on the seismic data. This is not a sacrifice, given the existing limitations on the resolution of AVO analysis (Spratt, S., SEG Expanded Abstracts (1987), Paper 10.7). A similar level of smoothing is implicit in the semblance calculations for velocity analysis in the incorporated patent application and any interpretation of peak amplitude measurements for specific events as described herein. However, the background normal techniques of the present invention are less sensitive to noise than B/A so that processing techniques that provide increased resolution seismic data are automatically accommodated by the techniques of the present invention.

AVO interpretation could also be performed like shear seismic interpretation, since the pseudo-shear amplitude $\Psi = (A-B)/2$ should be proportional to the shear impedance contrast. The conceptual model for shear amplitudes is that they depend weakly on the fluid content of the rock, while P amplitudes depend mainly on fluid content. This rule is useful for testing supposed oil-water or gas-water contacts. Unfortunately stratigraphic traps without a water level (in which the S or $\Psi$ amplitude may even be soft relative to the hardest plausible bounding non-reservoir layer) are inconveniently common. The one thing which is always useful to measure is the separation in (P,S)-impedance space, precisely what the background normal amplitude does.

Going beyond the A and $\Psi$ attribute to recover true compressional and shear impedance contrasts from AVO measurements is also possible with the methods of the present invention. However, this requires a prior knowledge of density and the long-wavelength trend of $V_P/V_S$, which is very difficult to obtain. Fortunately, lithology and fluid type can sometimes be distinguished using pseudo-shear directly, because the essential discrimination depends only on contrasts between adjacent lithologic units in the earth.

All seismic interpretation benefits from data processing techniques designed to suppress noise and enhance resolution. Standard methods may be used to prepare and process seismic data for analysis with the methods of the present invention as long as reasonable care is taken to avoid introducing artifacts which might bias the measurements. The processing steps and the order of the steps are selected according to the same rules as for any other seismic interpretation method, which include consistency, significance, and expedience.

Comparable processing steps on the A and background normal sections should be employed since both sections are used for amplitude analysis, as noted later herein. $\Psi$ sections may or may not be employed during interpretation, so comparable processing steps may be unnecessary. Amplitude measurements on selected events are usually performed as the final stage of processing.

The geologic implication of these attribute sections may be interpreted as follows. The A section represents the P-wave impedance as a function of travel time and position in the subsurface. The $\Psi$ section similarly represents the S-wave impedance. The background normal section represents lithologic and fluid anomalies of interest. Visual inspection of the sections allow the interpreter to form and assess geologic models of the subsurface. In general, the interpretation results will be based upon local expectation and may vary from location to location. Events of interest may be selected based upon high amplitude, anomalous behavior, or amplitude variation that is consistent with the geologic structure (e.g. a common downdip change, presumably due to fluid effects, that is consistent across part of the structure). Interpretation should be based upon all available information, such as amplitudes (and their variation), structure, local well control, expected geology, etc.

In addition, quantitative measurements of the amplitudes of selected events may be made and compared to numerical criteria (as noted hereinbefore) expected for oil or gas reservoirs in the local geologic environment. For example, background normal amplitudes (peak relative to preceding and succeeding event) greater than the A background level may be of sufficient amplitude to be further evaluated or interpreted.

Preferably, amplitudes of picked events on A and background normal sections are measured (they may optionally be smoothed) relative to preceding and succeeding events. Such amplitudes are divided by (optionally smoothed) rms A background to get peak amplitude measurements of the picked events. Measured $(A,\Psi)$ points for such selected events are plotted, where $\Psi$ is preferably determined from equation 10. Sections with juxtaposed graphs of (several) attribute measurements at the same lateral scale are then displayed. That is, several attribute measurements for selected events may be plotted on the same lateral scale as the sections to provide additional displays to aid in the interpretation of the section. (Such attributes might be event thickness, background amplitude as measured in the time gate, or the amplitude of the event.) These additional displays of the present invention clarify the presentation of the quantitative measurement of attributes for the sections. These displays and sections are then interpreted.

Hence from the above, it is clear that the present invention provides methods for measuring, displaying and interpreting subsurface features which can identify potential hydrocarbon reservoirs. The present invention determines and displays attributes which are desirable for useful lithologic and/or fluid content interpretation of seismic data.

The specific sequence of steps described hereinbefore for the methods of the present invention may be changed and still achieve the same result without departing from the scope of the present invention. As noted hereinbefore, the methods of the present invention are applicable to both compressional wave and/or shear wave seismic exploration techniques.

Many other variations and modifications may be made in the techniques hereinbefore described, by those having experience in this technology, without departing from the concepts of the present invention. Accordingly, it should be clearly understood that the methods depicted in the accompanying drawings and referred to in the foregoing description are illustrative only and are not intended as limitations on the scope of the invention.

What is claimed is:

1. A method for interpreting seismic data, comprising:

generating seismic records with a multiplicity of known source and receiver locations, determining more than one attribute which contains information about elastic properties and densities of the subsurface from said seismic records, determining the behavior of said more than one attribute which characterizes non-reservoir formations for a portion of said seismic records, and forming at least one new attribute which quantifies departures of the behavior of said more than one attribute which characterizes non-reservoir formations.

2. A method as claimed in claim 1, further comprising:

displaying said attributes and said behavior.

3. A method for interpreting seismic data, comprising:

generating seismic records with a multiplicity of known source and receiver locations, determining attributes which contain information about densities and shear and compressional wave velocities from said seismic records, determining the relationships among said determined attributes that characterize non-reservoir formations for a portion of said seismic records, compensating said determined attributes to remove said determined relationships, and displaying said compensated attributes.

4. A method as claimed in claim 3, wherein said determining said relationships for non-reservoir formations step, comprises, determining said relationships from said seismic records.

5. A method as claimed in claim 3, wherein said determining said relationships for non-reservoir formations step, comprises, determining said relationships from known or estimated geologic information.

6. A method as claimed in claim 3, wherein said determining said attributes step, comprises, determining pseudo-shear and normal incident amplitude attributes.

7. A method as claimed in claim 3, wherein said compensating said determined attributes step, comprises, forming a new attribute which quantifies departures of said attributes from said relationships.

8. A method for processing and displaying compressional seismic data, comprising:

generating seismic records with a multiplicity of known source and receiver locations, determining more than one attribute representative of signal amplitudes and their variations with offset from said seismic records, determining the behavior of said more than one attribute which characterizes non-reservoir formations for a portion of said seismic records, compensating said determined more than one attribute for said behavior which characterizes non-reservoir formations, and displaying relative differences between said attribute and said behavior.

9. A method for processing seismic data, comprising:

generating seismic records with a multiplicity of known source and receiver locations, determining optimized velocities and optimized attributes characterizing the variation of with offset, determining at least one background vector, determining attributes representative of at least one background normal vector, and displaying at least said attributes.

10. A method as claimed in claim 9, further comprising:

selecting events on said displays, and
measuring the amplitudes of said selected events.

11. A method as claimed in claim 9, wherein said displaying at least said attributes, comprises:
displaying sections of background normal attributes and said determined optimized attributes.

12. A method as claimed in claim 9, wherein said displaying at least said attributes, comprises:
displaying at least one of said background normal attributes and at least one of said determined optimized attributes.

13. A method as claimed in claim 12, wherein said displaying at least one of said background normal attributes and at least one of said determined optimized attributes comprises a cross-plot of such attributes.

* * * * *